United States Patent Office 3,503,575
Patented Mar. 31, 1970

3,503,575
HELICOPTER
Mikhail Leontievich Mil, Starokonjushenny pereulok 19, kv. 51, Moscow, U.S.S.R., and Oleg Petrovich Bakhov, Ulitsa Elektrofikatsii 22, kv. 59, Ljubertsy, Moskovskaya oblast, U.S.S.R.
Filed Sept. 13, 1967, Ser. No. 667,583
Int. Cl. B64c 27/08, 25/06
U.S. Cl. 244—17.17       3 Claims

ABSTRACT OF THE DISCLOSURE

A helicopter having main rotors mounted on the tips of wings, tapered in plan, each wing being pivotally connected by its tapered tip to the fuselage and being additionally linked to the fuselage and landing gear assembly by means of a system of rods. The system of rods comprises three rods connected with the wider tip of each wing, two of which rods converge in the landing gear assembly of the helicopter, while the third one is secured to the tail section of the fuselage and has an additional support with the landing gear assembly and the wing.

---

Figure 1:
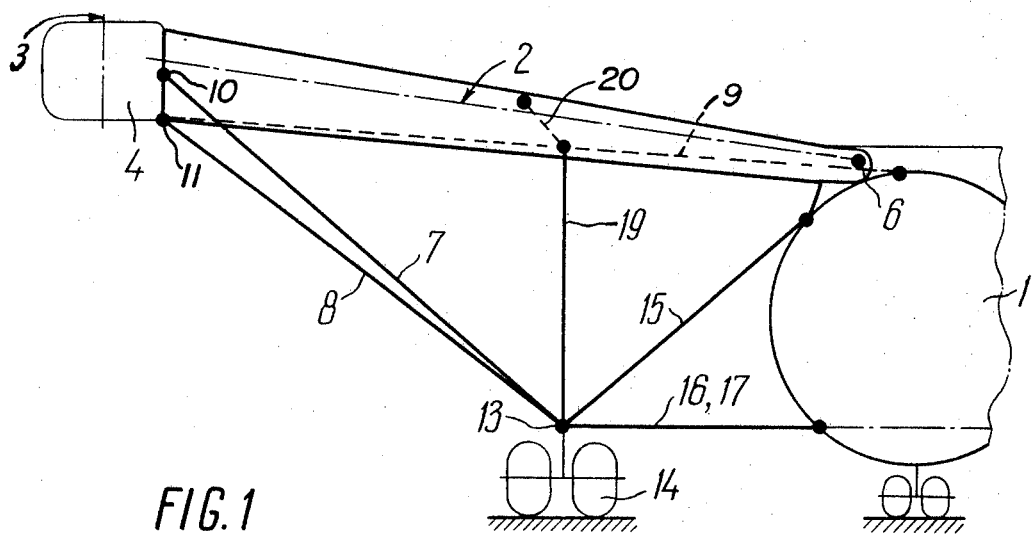

The present invention relates to flying machines and, more particularly, to helicopters with main rotors mounted on wing tips.

In known helicopters with the above noted arrangement of main rotors the wings are rectangular or tapered in plan. In the case of tapered wings, they are rigidly fixed to the fuselage at the wider tip (bigger chord), the main rotors being mounted on the tapered tip.

In this case, a wing with a bigger root chord is not advantageous because of the losses in the main rotors' thrust in vertical flight, as the wider section of the wing lies within the zone of maximum induced velocities developing on the rotor blade tips.

Furthermore, in known helicopters of a transverse layout, the tapered wing, so shaped for strength and rigidity reasons, has too big a weight and an excessive area, which adversely affects the helicopter's aerodynamics in flight with high or negative wing angles of attack.

An object of the present invention is to eliminate these disadvantages by providing a helicopter of a transverse layout with tapered-in-plan wings which would satisfy the conditions of strength and rigidity of fixation of the main rotors to the fuselage in all directions (to eliminate the so-called "ground resonance"), to off-load the main rotors at a maximum speed and have a minimum possible area for improving the helicopter's aerodynamics in flight with high wing angles of attack.

The invention thus provides a helicopter with main rotors mounted on the tips of wings tapered in plan, each wing being pivotally connected to the fuselage by the tapered tip (smaller chord) and additionally coupled therewith by a system of rods.

Implied by the word "tapered" here and below is not only the shape of a taper in its exact meaning but also one close to it, including, for instance, one with somewhat curvilinear contours.

In the preferred exemplary embodiment of the invention the system of rods comprises three rods connected with the wider tip of the wing, two rods meeting in the landing gear assembly of the helicopter, while the third one is fastened to the tail section of the fuselage.

To preclude the bending of the third rod, it is feasible to provide the latter with additional support formed by two rods, one of which is secured to the landing gear assembly and the other of which is fastened to the wing.

An advantage of the helicopter described in the invention lies in the fact that the wing, pivotally connected by a smaller chord to the fuselage and attached thereto by a system of rods, has a reduced weight as compared with known types of wings, and possesses greater strength and rigidity, since the geometry of the system of rods is not so precise as that of the wing.

Another advantage of the invention is that the selected wing shape insures reduced losses in thrust at vertical takeoff as compared with known type of wing, since the wider section of the wing lies within the zone of low or reverse induced velocities in the central section of the main rotor, while the wing area within the zone of high induced velocities, i.e. on the rotor blade tips, is small.

In addition, the proposed wing has a smaller area than known wings, which improves the helicopter aerodynamics in flight with high wing angles of attack.

Figure 2:
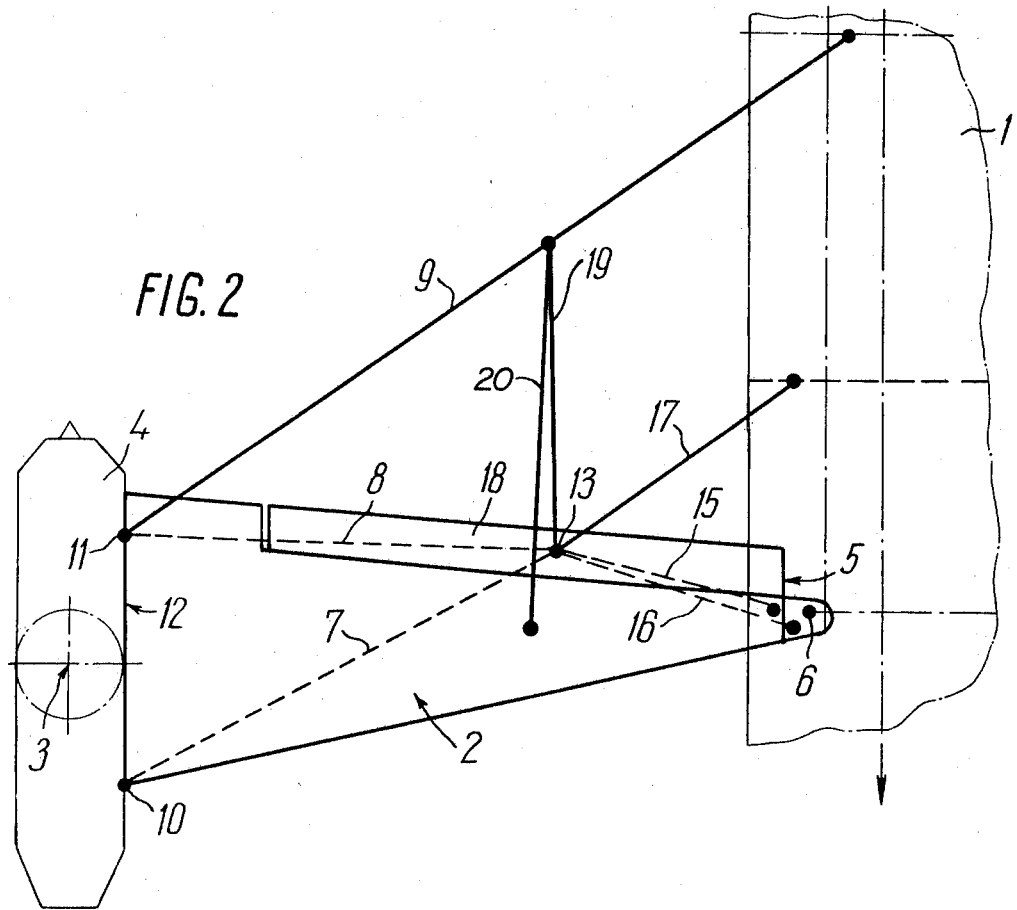

The invention will be more apparent from the following description of an exemplary embodiment and appended drawings, wherein:

FIG. 1 is a front-view diagram of a helicopter according to the invention, main rotors being mounted on wing tips the port wing being omitted; and FIG. 2 is a top view of the structure of FIG. 1, the flight direction being indicated with an arrow.

Referring to FIGS. 1 and 2, the helicopter comprises a fuselage 1 having wings 2 with main rotors 3 having engines 4 mounted on the wing tips.

Each wing 2 is tapered in plan, fastened by its tapered tip 5 to the fuselage 1 by means of a hinge 6, and is additionally linked therewith by three rods 7, 8 and 9.

Rods 7 and 8 connect, respectively, a nose section 10 and tail section 11 of an end rib 12 of the wing 2 with an assembly 13 of a landing gear 14. The third rod 9 links the tail section 11 of the end rib 12 of the wing 2 with the tail section of the fuselage 1.

The helicopter landing gear assembly 13 is located substantially under the wing 2 and is attached to the fuselage 1 by means of rods 15, 16 and 17.

The wings can be provided with a deflecting flap 18.

To preclude the bending of the rod 9, the latter is additionally linked with the assembly 13 of the landing gear 14 by a rod 19, and with the wing 2 by a rod 20.

The invention is not limited by the exemplary embodiment described hereinabove and may have modifications.

We claim:

1. A helicopter, comprising: a fuselage; wings tapered in plan and located on both sides of said fuselage, said wings each having narrow and wide tips, each said wing being pivotally connected to said fuselage at the narrow tip thereof; main rotors on the wide tips of said wings; landing gear assemblies, each being located substantially under a respective one of said wings; and a system of rods linking said wings to said fuselage and said landing gear assemblies.

2. A helicopter as claimed in claim 1, in which said fuselage includes a tail section and said system of rods comprises three rods linked with the wide tip of each of said wings, two of said rods meeting at the related landing gear assembly, the third rod being secured to the tail section of said fuselage.

3. A helicopter as claimed in claim 2, including and in which said third rod has an additional support formed by two additional rods, one of which is secured to said landing gear assembly, the other one being fastened to the associated of said wing.

References Cited

UNITED STATES PATENTS

| | | | |
|---|---|---|---|
| 1,943,290 | 1/1934 | Clarke | 244—6 |
| 1,959,270 | 5/1934 | Hedlof | 244—6 |
| 2,008,424 | 7/1935 | Stalker | 244—6 |
| 2,103,881 | 12/1937 | Wagner | 244—6 X |
| 2,226,978 | 12/1940 | Pateras Pescara | 244—6 |
| 2,313,447 | 3/1943 | Leka | 244—6 X |
| 2,661,168 | 12/1953 | Mortka | 244—6 X |
| 3,072,197 | 1/1963 | Stahmer | 244—6 X |

MILTON BUCHLER, Primary Examiner

P. E. SAUBERER, Assistant Examiner

U.S. Cl. X.R.

244—17.23